(12) United States Patent
Richardson (10) Patent No.: US 10,183,809 B2
(45) Date of Patent: Jan. 22, 2019

(54) PIN RETENTION FOR CONVEYOR MODULES

(71) Applicant: Habasit AG, Reinach (CH)

(72) Inventor: Andrew Richardson, Michelbach-le-Haut (FR)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 15/163,642

(22) Filed: May 24, 2016

(65) Prior Publication Data

US 2017/0341868 A1 Nov. 30, 2017

(51) Int. Cl.
*B65G 15/30* (2006.01)
*B65G 17/08* (2006.01)
*B65G 17/40* (2006.01)
*B65G 17/30* (2006.01)

(52) U.S. Cl.
CPC .............. *B65G 17/30* (2013.01); *B65G 17/08* (2013.01); *B65G 17/083* (2013.01); *B65G 17/40* (2013.01); *B65G 2207/12* (2013.01)

(58) Field of Classification Search
CPC .................................................. B65G 17/083
USPC .................................................. 198/850–853
See application file for complete search history.

(56) References Cited

U.S. PATENT DOCUMENTS

| | | | | |
|---|---|---|---|---|
| 4,911,681 A * | 3/1990 | Funkhouser | ........... | B65G 17/08 156/137 |
| 4,934,518 A * | 6/1990 | Lapeyre | ................. | B65G 17/08 198/853 |
| 5,918,730 A * | 7/1999 | Wilcher | ................. | B65G 19/20 198/733 |
| 5,960,937 A * | 10/1999 | Stebnicki | ............... | B65G 17/08 198/851 |
| 6,029,802 A * | 2/2000 | Musiari | .................. | B65G 17/08 198/779 |
| 6,213,292 B1 * | 4/2001 | Takahashi | .............. | B65G 17/08 198/851 |
| 6,308,825 B1 * | 10/2001 | Nakamura | ............. | B65G 17/08 198/853 |
| 6,345,715 B2 * | 2/2002 | Palmaer | ................. | B65G 17/08 198/852 |
| 6,474,464 B1 * | 11/2002 | Horton | ................... | B65G 17/08 198/850 |
| 6,644,466 B2 * | 11/2003 | Knott | ................... | B65G 17/086 198/850 |

(Continued)

FOREIGN PATENT DOCUMENTS

| | | |
|---|---|---|
| EP | 2050347 A1 | 4/2009 |
| WO | 03078124 A1 | 9/2003 |
| WO | 2015025615 A1 | 2/2015 |

*Primary Examiner* — Douglas A Hess
(74) *Attorney, Agent, or Firm* — Hodgson Russ LLP (57) ABSTRACT

A conveyor module includes a module body with a pair of first link ends extending in a first direction of travel and a second link end extending in a second direction of travel opposite the first direction. Each of the first and link ends has a transverse opening therethrough. At least one of the first link ends has a first mating portion. A pin is configured to be received in the first transverse openings of the module body. The pin has a shaft and a lever affixed at a first end of the shaft. The lever has a second mating portion configured to be rotatably coupled with the first mating portion of the module body, thereby preventing transverse movement of the shaft.

28 Claims, 12 Drawing Sheets

(56) References Cited

U.S. PATENT DOCUMENTS

| | | | |
|---|---|---|---|
| 6,662,938 B2 * | 12/2003 | Damkjaer | B29C 33/0033 |
| | | | 198/852 |
| 6,763,936 B2 * | 7/2004 | Marsetti | B65G 17/08 |
| | | | 198/844.1 |
| 6,978,885 B1 | 12/2005 | Schumacher | |
| 7,766,159 B2 * | 8/2010 | Krisl | B65G 17/08 |
| | | | 198/850 |
| 7,775,347 B2 * | 8/2010 | Cornelissen | B65G 17/08 |
| | | | 198/850 |
| 8,322,522 B2 * | 12/2012 | Hall | B65G 17/08 |
| | | | 198/851 |
| 8,474,607 B2 * | 7/2013 | Hall | B65G 17/083 |
| | | | 198/850 |
| 9,205,986 B2 * | 12/2015 | Miglavs | B65G 23/06 |
| 9,216,859 B2 * | 12/2015 | Visconti | B65G 15/30 |
| 9,482,314 B2 * | 11/2016 | Nishizawa | F16G 13/06 |
| 9,494,214 B2 * | 11/2016 | Morimoto | F16G 13/06 |
| 9,622,553 B2 * | 4/2017 | Lauren | A44C 5/105 |
| 2010/0175969 A1 | 7/2010 | Marsetti | |
| 2014/0326584 A1 | 11/2014 | Visconti et al. | |

\* cited by examiner

PIN RETENTION FOR CONVEYOR MODULES

FIELD OF THE DISCLOSURE

The present disclosure relates to modules for conveyors, and more particularly, to retaining pins in conveyors.

BACKGROUND OF THE DISCLOSURE

Assembling conveyors, especially chain conveyors, is very difficult. There are currently no solutions on the market that allows for tool-free assembly—generally, either the pin must be forced in to chain link using a hammer or otherwise pressed in using dedicated tools. As difficult as assembly is, it is even more difficult to disassemble such belts. It is common for collateral components to be damaged while extracting pins to disassemble a chain. Furthermore, in belts that require dedicated tools for assembly/disassembly, sufficient space is needed around the belt for use of the tool. As such, use of the tool may be limited to specific positions in the belt system. Accordingly, there is a long-felt need for a conveyor with a retained pin that is more easily removed.

BRIEF SUMMARY OF THE DISCLOSURE

In an embodiment, a conveyor module includes a module body. The module body has a pair of first link ends extending in a first direction of travel. Each first link end has a first transverse opening therethrough. At least one of the first link ends has a first mating portion. A second link end extends from the module body in a second direction of travel opposite the first direction. The second link end has a second transverse opening therethrough. A pin is configured to be received in the first transverse openings of the module body. The pin has a shaft and a lever affixed at a first end of the shaft. The lever has a second mating portion configured to be rotatably coupled with the first mating portion of the module body, thereby preventing transverse movement of the shaft. The first mating portion may be a slot and the second mating portion may be a tab configured for rotatable insertion into the slot. In another embodiment, the first mating portion is a nest and the second mating portion is a shape of the lever configured to be contained within the nest.

In some embodiments, the lever may comprise a first locking portion and the at least one first link end may comprise a second locking portion configured to couple with the first locking portion to prevent rotation of the pin. The first locking portion may be a protrusion and the second locking portion may be a recess, wherein the protrusion is configured to couple with the recess. In other embodiments, the first locking portion is a latch and the second locking portion is a ledge configured to couple with the latch.

In some embodiments, the at least one first link end has a first ramp with a changing elevation in a transverse direction. In such embodiments, the lever includes a second ramp configured to be cooperate with the first ramp such that the pin is translated in a transverse direction when the pin is rotated.

The shaft has a length, and in some embodiments, the shaft has a first diameter at a first end portion of the length and a second diameter at a central portion of the length. The second diameter may be larger than the first diameter. The shaft may include a tapered portion between the first end portion and the central portion. In some embodiments, the shaft also has a second end portion with the first diameter, and may include a tapered portion between the central portion and the second end portion. The pin may be manufactured using a metal injection molding process ("MIM").

In another embodiment, a conveyor module includes a module body. The module body has a pair of first link ends extending in a first direction of travel. Each first link end has a first transverse opening therethrough. At least one of the first link ends has a first ramp with a changing elevation in a transverse direction. A second link end extends from the module body in a second direction of travel opposite the first direction. The second link end has a second transverse opening therethrough. A pin is configured to be received in the first transverse openings of the module body. The pin has a shaft and a lever affixed at a first end of the shaft. The lever has a second ramp configured to cooperate with the first ramp such that the pin is translated in a transverse direction when the pin is rotated.

In another embodiment, a conveyor module includes a module body. The module body has a pair of first link ends extending in a first direction of travel. Each first link end has a first transverse opening therethrough. A second link end extends from the module body in a second direction of travel opposite the first direction. The second link end has a second transverse opening therethrough. A pin is configured to be received in the first transverse openings of the module body. The pin has a shaft and a groove around at least a portion of the circumference of the shaft. The module further includes a clip configured to insertion into a notch of at least one of the first link ends. The clip has a tab configured to engage the groove of the pin to prevent transverse movement of the pin. In some embodiments, the notch extends to both first link ends and the clip includes two tabs, and the pin includes two grooves, and where each tab of the clip is configured to engage a corresponding groove of the pin. The module body may have a first locking portion and the clip may have a second locking portion configured to couple with the first locking portion to prevent removal of the clip from the module body. For example, the first locking portion is a ledge and the second locking portion is a latch configured to couple with the ledge.

In another embodiment, a conveyor module includes a module body. The module body has a pair of first link ends extending in a first direction of travel. Each first link end has a first transverse opening therethrough. At least one of the first link ends has a bayonet keyway. A second link end extends from the module body in a second direction of travel opposite the first direction. The second link end has a second transverse opening therethrough. A pin is configured to be received in the first transverse openings of the module body. The pin has a shaft and a lever affixed at a first end of the shaft. The pin has a bayonet tab on the shaft to cooperate with the bayonet keyway, thereby retaining the pin in the first transverse openings. The pin may have two tabs and each of the first link ends includes corresponding bayonet keyways for engaging the tabs of the pin.

In another embodiment, a conveyor module includes a module body. The module body has a pair of first link ends extending in a first direction of travel. Each first link end has a first transverse opening therethrough. A second link end extends from the module body in a second direction of travel opposite the first direction. The second link end has a second transverse opening therethrough. A pin is configured to be received in the first transverse openings of the module body. The pin has a shaft with a length, a first diameter at a first end portion, and a second diameter at a central portion of the length. The second diameter may be larger than the first diameter. The shaft may include a tapered portion between the first end portion and the central portion. In some embodiments, the shaft also has a second end portion with the first diameter, and may include a tapered portion between the central portion and the second end portion. The pin may be manufactured using a metal injection molding process ("MIM").

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

In a first aspect depicted in FIGS. 1-4, the present disclosure may be embodied as a module 10 for a conveyor, such as, for example, a chain conveyor. The module 10 comprises a module body 12 having a pair of first link ends 14 extending in a first direction of travel and a second link end 16 extending in a second direction of travel (opposite from the first direction of travel). The direction of travel refers to the direction of travel of an assembled conveyor. For example, where the module is a chain module, the direction of travel refers to the direction of travel of a chain if the module was incorporated in a chain. Each of the first link ends 14 has a first transverse opening 15 therethrough, and the second link end 16 has a second transverse opening 17 therethrough. The first openings 15 are arranged to be aligned with the second opening 17 of an adjacent module such that the modules may be connected in a hinge-like manner.

The module 10 includes a pin 20 configured to be received in the first transverse openings 15. As such, the pin 20 is also able to be inserted through the second transverse opening 17 of an adjacent module. The pin 20 has a shaft 22 having a first end 24 and a second end 26. A lever 28 is affixed at the first end 24 and arranged such that a torque may be applied, for example, manually applied by an individual, to rotate the pin 20 about the shaft 22.

At least one of the first link ends has a first mating portion 30. The lever 28 of the pin has a second mating portion 32 configured to be rotatably coupled with the first mating portion 30. As such, when the shaft 22 of the pin 20 is inserted in the first link ends 14 and the lever 28 is rotated, the first mating portion 30 can be coupled with the second mating portion 32 thereby preventing transverse movement of the pin 20. In the embodiment depicted in FIGS. 1-4, the first mating portion 30 is a slot and the second mating portion 32 is a tab configured for insertion in the slot.

The module 10 may further include locking portions to prevent rotation of the pin 20 once the first and second mating portions, 30, 32 are coupled. For example, the lever 28 may include a first locking portion 34 and the corresponding first link end 14 may include a second locking portion 36. In the example depicted in FIGS. 1-4 (in particular, see FIGS. 3 and 4, the first link end 14 includes a protrusion 37 and the lever 28 includes a recess 35. As such, when the first and second mating portions 30, 32 are coupled, the recess 35 engages with the protrusion 37 to inhibit rotation of the pin 20. FIG. 5 depicts another embodiment of module 80, which is similar to the module 10 of FIGS. 1-4 except for a different module body configuration. In this way it can be seen that embodiments of the present disclosure are exemplary, and components may have differing configurations.

Figure 6A:
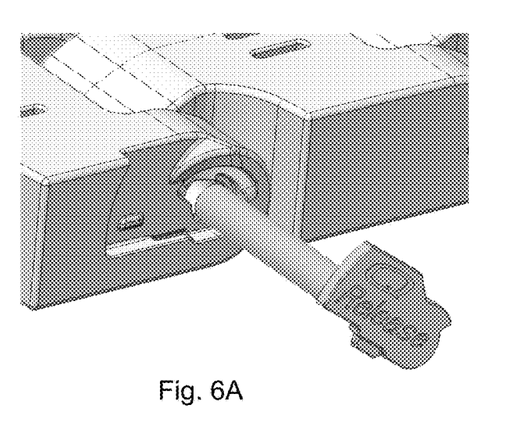
FIG. 6A is a perspective view of a portion of a module according to another embodiment of the present disclosure; where the pin is shown just entering the module body.
Figure 6B:
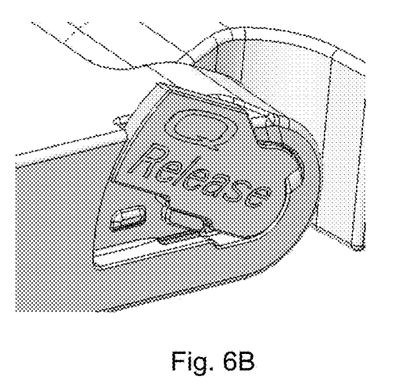
FIG. 6B is a perspective view of a portion of a module wherein the lever of the pin is shown in an unlocked position.
Figure 6C:
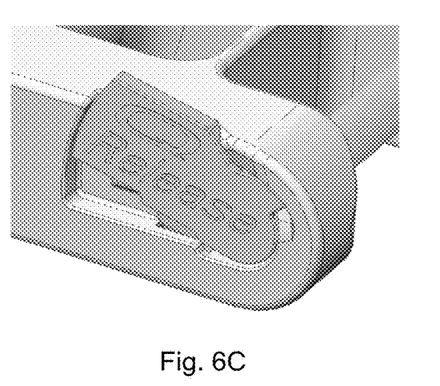
FIG. 6C is another perspective view of a portion of a module where the first and second mating portions are shown engaging one another during rotation of the pin.
Figure 6D:
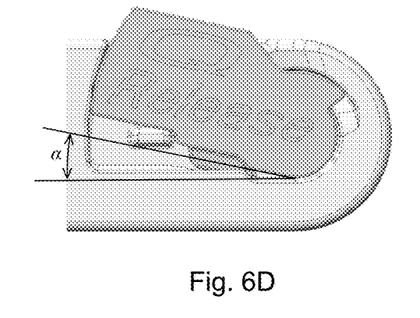
FIG. 6D is an end elevation view of the module of FIG. 6C.
Figure 6E:
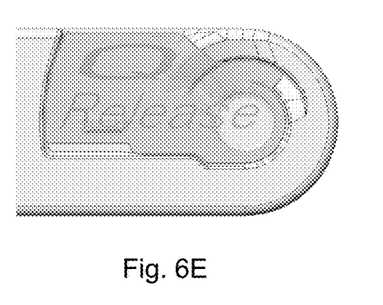
FIG. 6E is an end elevation view of the module of FIGS. 6C-6D showing full engagement of the first and second mating portions and the first and second locking portions (the pin is depicted as transparent to show the first and second locking portions)

In FIGS. 6A-6E, pins, similar to those of the module 10 above, are shown at various points during pin insertion (or removal). In particular, FIG. 6B shows where the pin has been inserted, and the lever has been rotated until a point before the first and second mating portions engage. In FIGS. 6C-6D, the first and second mating portions are partially engaged. The angle α where the first and second mating portions begin to engage can be varied according to the application. In some embodiments, the lever angle α is between 3° and 20°. In other embodiments, the angle can be less than 3° or greater than 20°. In the embodiment depicted in FIGS. 6C-6E, the lever angle α at engagement is approximately 15° (i.e., the lever moves through 15° of rotation from the point where the first and second mating portions begin to engage, to the point at which the mating portions are fully engaged (α=0°). FIG. 6E depicts where the lever (and pin) have been rotated to fully engage the first and second mating portions. In FIG. 6E, the lever is depicted as transparent for convenience, so that the first and second locking portions are shown to be engaged. In this way, unwanted rotation of the pin is prevented by the first and second locking portions, and migration of the pin out of the first transverse openings is prevented by the first and second mating portions.

Components of embodiments of the present disclosure may be made from various materials. For example, the module body may be made from plastics, such as polyethylene (e.g., ultra-high molecular weight polyethylene), polypropylene, polyamide, polyoxymethylene (POM), and polybutylene terephthalate (PBT); composites, such as reinforced polyamide and reinforced polypropylene; metals, such as cast iron, aluminum, and stainless steel; or combinations of these. Similarly, pins can be made from any material such as plastics (polyamide) or metals (for example, carbon steel, stainless steel, or aluminum). Due to the shapes necessary for some embodiments of the present invention, it may be beneficial to produce pins and/or other components using processes such as metal injection molding (MIM).

Components of the disclosed modules can be made in suitable colors, such as white, gray, blue, black, green, yellow, etc. Belts may be constructed of modules of different colors such that modules can be more readily identified. For example, modules of the present disclosure having pins that are more easily removed, can be differently colored from other modules. Or, modules with easily-removable pins may have pins with a different color such that the modules are more readily identified. In another example, modules can be differently colored to facilitate detection of running speed, to trigger the placement of conveyed materials, etc. Other embodiments having modules or components of modules with differing colors will be apparent to one having skill in the art in light of the present disclosure.

In another embodiment of a module 110 depicted in FIGS. 8-12, the first mating portion 130 is a nest 131 and the corresponding second mating portion 132 is a keyed shape of the lever 128 configured to fit within the nest 131. As will be apparent in view of at least FIG. 9, when the shaped lever 128 is coupled with the nest 131 of a first link end 114, the pin 120 will not migrate out of the first transverse openings 115 unless the lever 128 is rotated to uncouple the first and second mating portions 130, 132. In this embodiment, a first locking portion 134 is provided as a latch 135 and the second locking portion 136 is provided as a ledge 137 on which the latch 135 may be engaged (see FIGS. 10 and 11). In such an embodiment, the latch 135 may be uncoupled through the use of a tool, such as, for example, a screwdriver.

Figure 21:
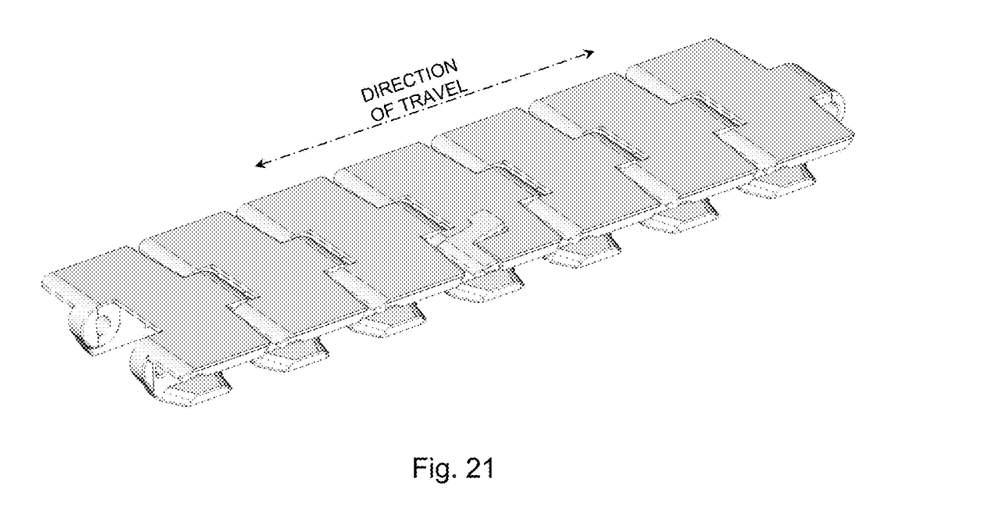
FIG. 21 is a perspective view of a length of a belt formed by a plurality of modules, wherein one module is a module according to an embodiment of the present disclosure (the pin is shown partially rotated).

In some embodiments, the lever of the pin and the associated first link end may be configured such that when the lever is engaged with the link end (i.e., when the first and second mating portions are coupled), then the module has a shape that is substantially the same as other modules of the same chain. For example, in FIG. 9, it can be seen that the overall shape of the presently-disclosed module 110 is substantially the same as that of another module 102 of the same chain (see also FIG. 21).

Figure 1:
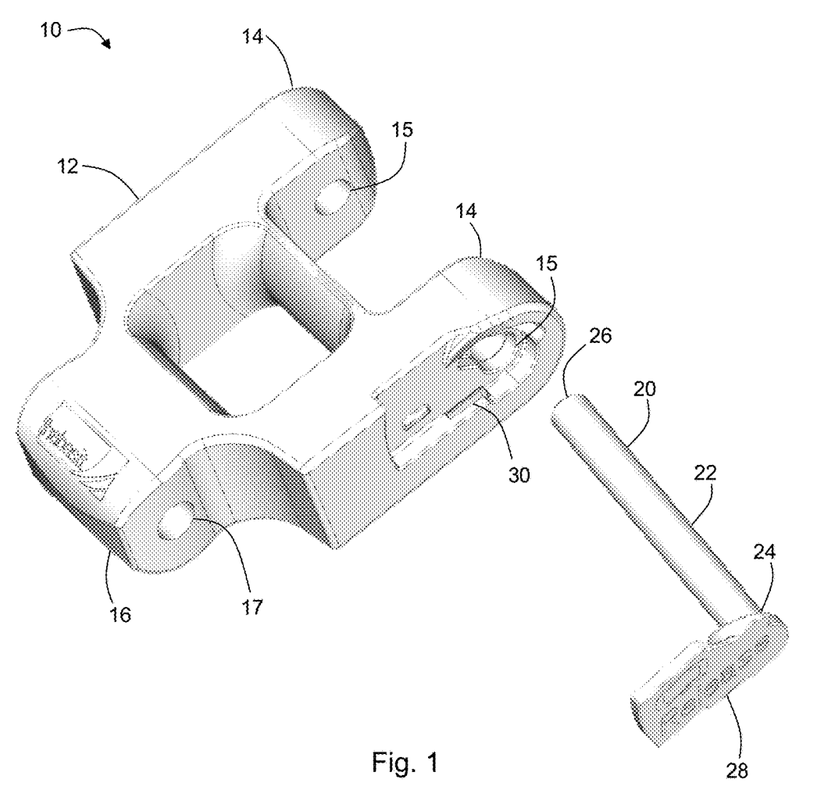
FIG. 1 is a perspective view of a module according to an embodiment of the present disclosure, where the pin is shown removed from the module body.
Figure 2:
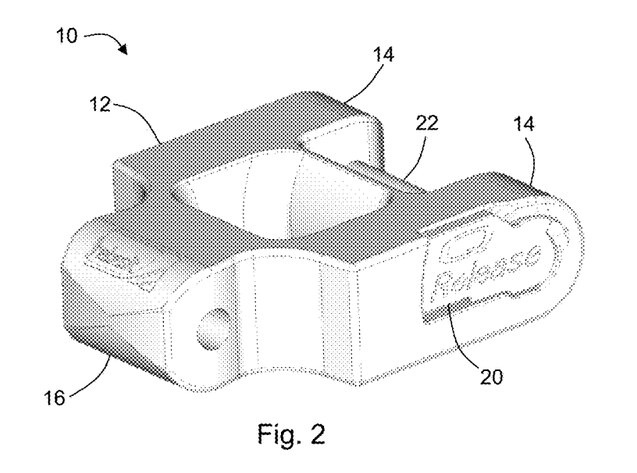
FIG. 2 is a perspective view of the module of FIG. 1, where the pin has been inserted and locked to the module body.
Figure 3:
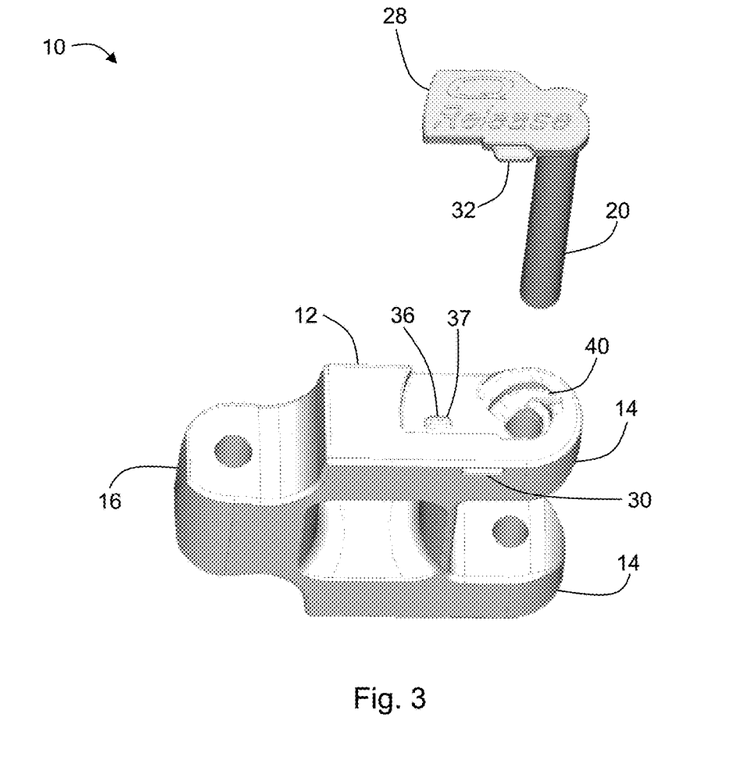
FIG. 3 is bottom oblique view of the module of FIGS. 1 and 2, where the pin is shown removed from the module body.
Figure 4:
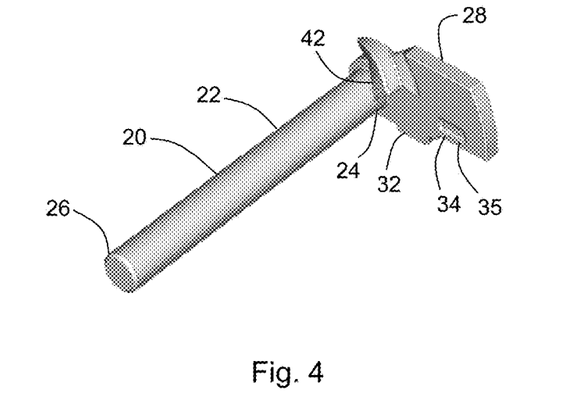
FIG. 4 is a perspective view of the pin of FIGS. 1-3.
Figure 5:
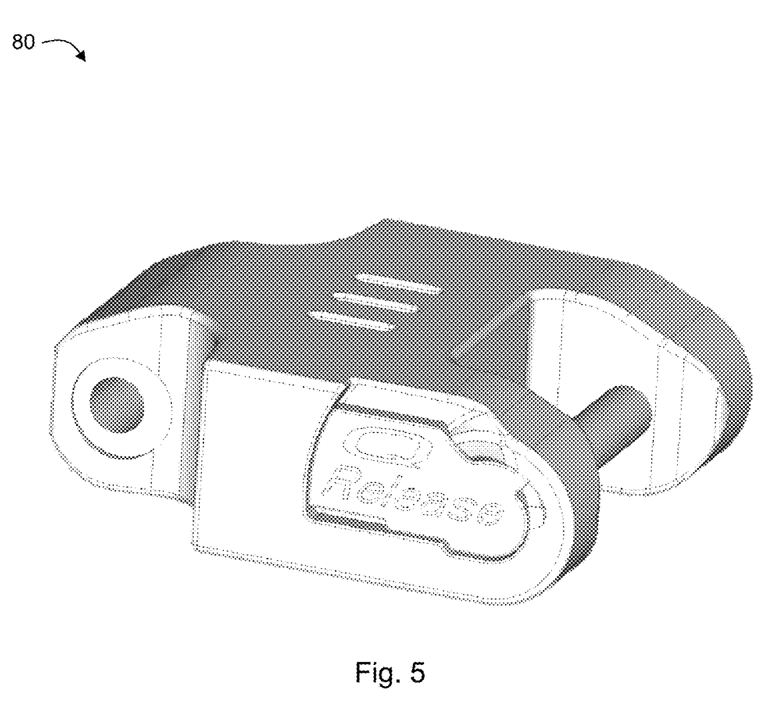
FIG. 5 is a perspective view of a module according to another embodiment of the present disclosure.

In another aspect of the present disclosure, a module 10 includes a module body 12 with a pair of first link ends 14 extending in the first direction of travel (e.g., direction of belt travel) and a second link end 16 extending in the second direction of travel (see FIGS. 1 and 3-4). Each of the first link ends 14 has a first transverse opening 15 therethrough, and the second link end 16 has a second transverse opening 17 therethrough. The first openings 15 are arranged to be aligned with the second opening 17 of an adjacent module such that the modules may be connected in a hinge-like manner. At least one of the first link ends 14 has a first ramp 40 oriented such that the first ramp 40 changes in elevation in the transverse direction (i.e., a direction transverse to the direction of belt travel—along the same axis as the transverse openings).

The module 10 includes a pin 20 configured to be received in the first transverse openings 15. As such, the pin 20 is also able to be inserted through the second transverse opening 17 of an adjacent module. The pin 20 has a shaft 22 having a first end 24 and a second end 26. A lever 28 is affixed at the first end 24 and arranged such that a torque may be applied, for example, manually applied by an individual, to rotate the pin 20 about the shaft 22.

Figure 7A:
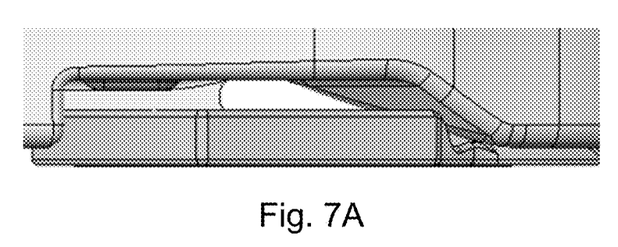
FIG. 7A is a top view of a portion of a module with a ramp, the Figure showing the pin where the first and second ramps are in initial contact at a lever angle of 30°.
Figure 7B:
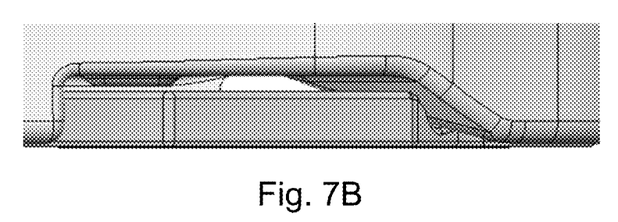
FIG. 7B is a top view of the module of FIG. 7A showing the pin having been partially rotated through the first and second ramps at a lever angle of 25°.
Figure 7C:
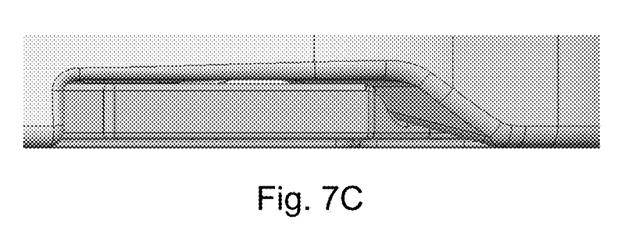
FIG. 7C is a top view of the module of FIGS. 7A-7B showing the pin having been rotated through the complete first and second ramps at a lever angle of 15°, such that the pin is fully translated into the module body.
Figure 8:
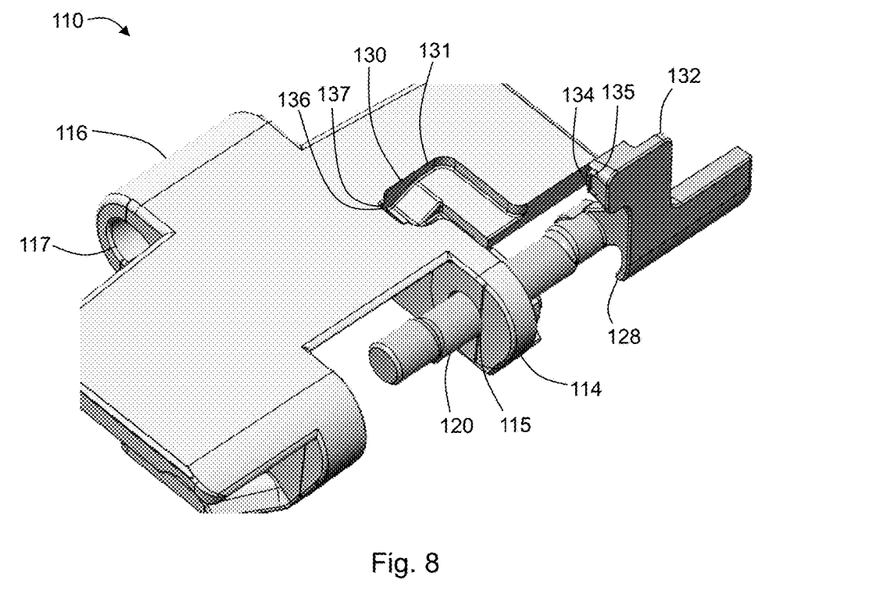
FIG. 8 is a perspective view of a module according to another embodiment of the present disclosure.
Figure 9:
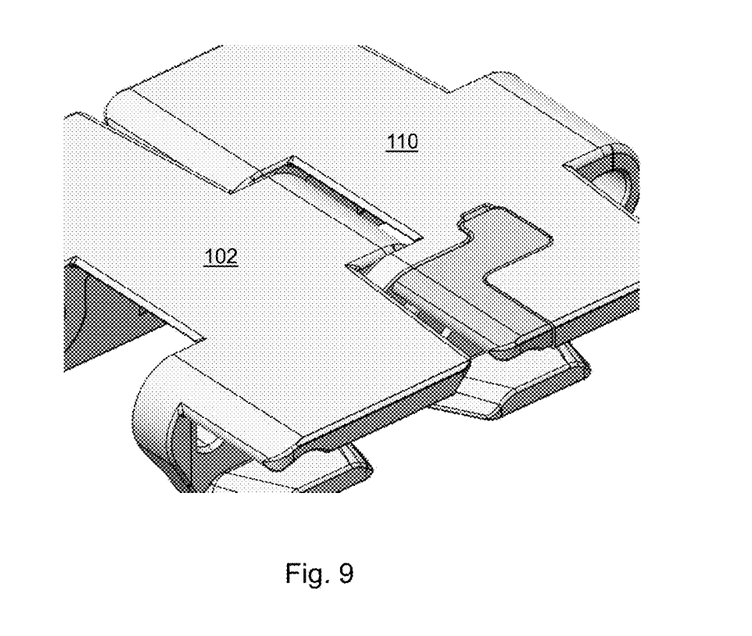
FIG. 9 is a perspective view of the module of FIG. 8 connected with another chain module.
Figure 10:
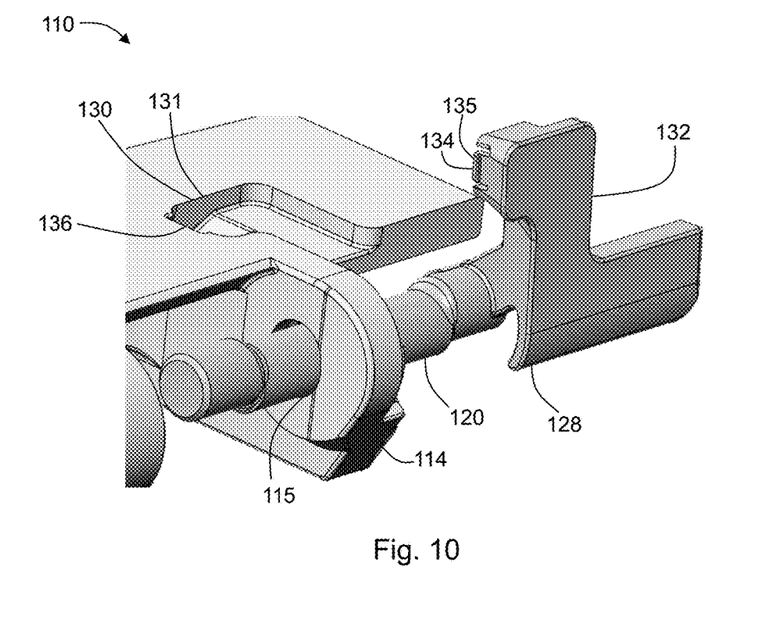
FIG. 10 is a detail perspective view of a portion of the module of FIG. 8.
Figure 11:
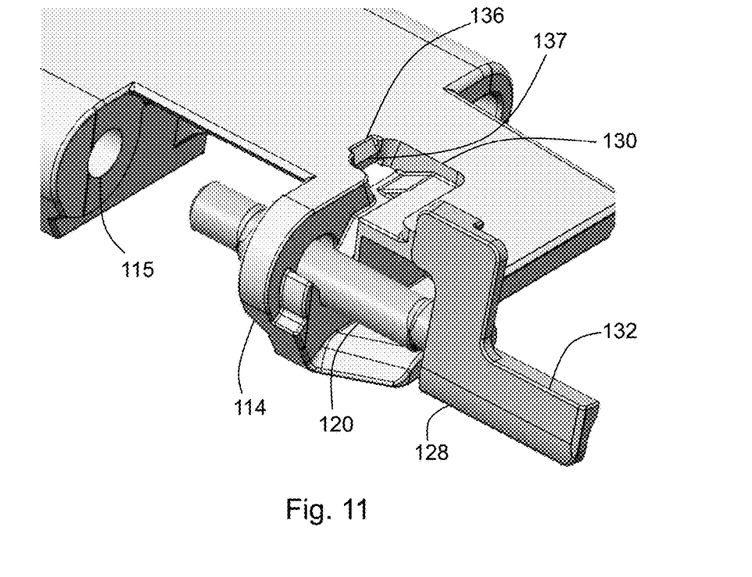
FIG. 11 is another detail view of a portion of the module of FIGS. 8 and 10.

The lever 28 includes a second ramp 42, which is configured to cooperate with the first ramp 40 such that, when the pin is rotated while the first and second ramps 40, 42 are in contact with each other, the pin 20 is translated in the transverse direction (see FIGS. 7A-7C). In this manner, the pin 20 can be at least partially ejected—translated at least partially out of the first transverse openings 15—by rotation of the lever 28 (see, for example, FIG. 7B). In some embodiments, it is advantageous to position the second ramp 42 in a location of the lever 28 proximate to the shaft 22. In this way, the first and second ramps 40, 42 can act to translate the pin 20 without undue force on a distal portion of the lever 28.

As can be seen in FIGS. 1 and 3-4, aspects of the present disclosure can be used in combination. For example, where first and second mating portions 30, 32 are used to retain the pin 20 in the first openings 15, a first ramp 40 and a second ramp 42 can be used to eject the pin 20 once the mating portions are uncoupled. In this manner, using the lever 28 to rotate the pin 20 will uncouple the mating portions 30, 32 and eject the pin 20. In some embodiments, the uncoupling and ejection operations occur sequentially. For example, where the first and second mating portions 30, 32 begin to disengage at a lever angle α of 15°, the first and second ramps 40, 42 may be configured to begin ejecting the pin 20 at a lever angle greater than 15°. For example, the first and second ramps 40, 42 may be configured to eject the pin 20 as the lever rotates through angles from 15° (FIG. 7C) to 30° (FIG. 7A).

Figure 12:
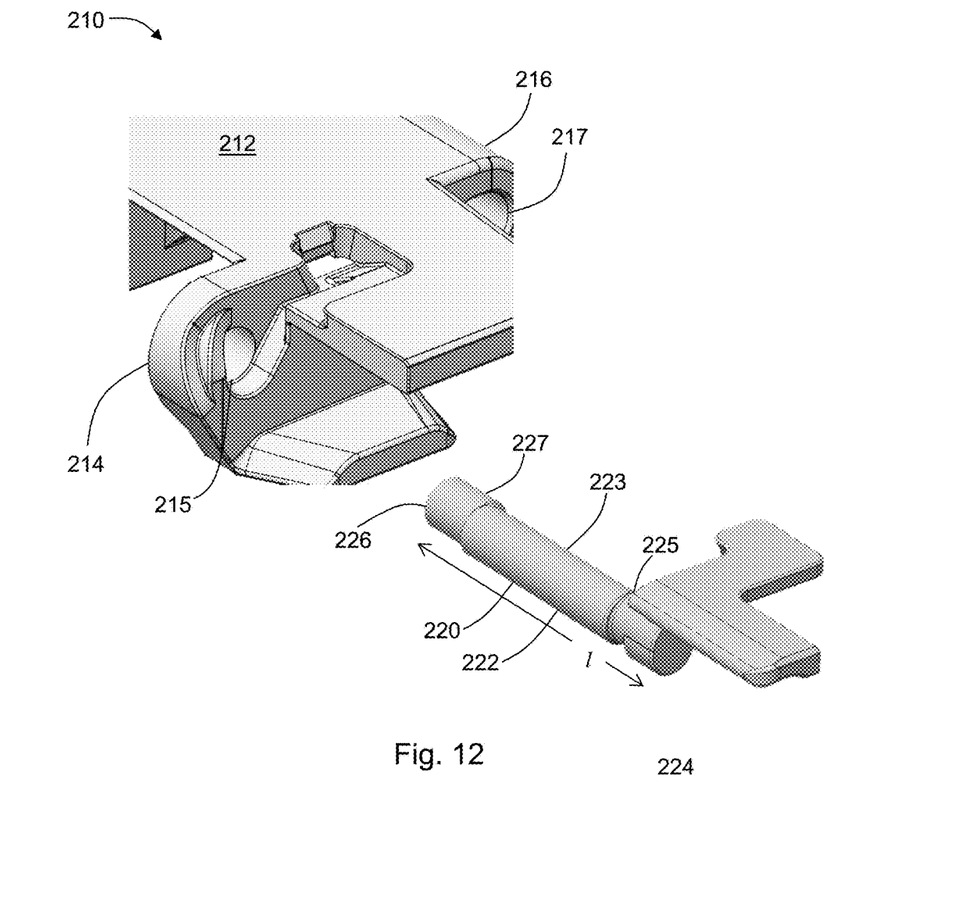
FIG. 12 is a detail view of a portion of a module according to another embodiment of the present disclosure.

In another aspect of the present disclosure (an example of which is depicted in FIG. 12), a module 210 includes a module body 212 with a pair of first link ends 214 extending in the first direction of travel and a second link end 216 extending in the second direction of travel. Each of the first link ends 214 has a first transverse opening 215 therethrough, and the second link end 216 has a second transverse opening 217 therethrough. The first openings 215 are arranged to be aligned with the second opening 217 of an adjacent module such that the modules may be connected in a hinge-like manner.

The module 210 includes a pin 220 configured to be received in the first transverse openings 215. As such, the pin 220 is also able to be inserted through the second transverse opening 217 of an adjacent module. The pin 220 has a shaft 222 having a first end 224 and a second end 226. The shaft 222 has a length l and a first diameter at a first end portion 225 of the length. The shaft 222 has a second diameter at a central portion 223 of the length. In an embodiment, the second diameter is larger than the first diameter such that the strength of the shaft 222 is greater in the central portion 223. The shaft 222 may have a tapered portion between the first end portion 225 and the central portion 223, such that the diameter of the shaft 222 tapers from the first diameter to the second diameter. In an embodiment, a second end portion 227 of the shaft 222 is the same diameter as the first end portion 225. The shaft 222 may have a tapered portion between the central portion 223 and the second end portion 225, such that the diameter of the shaft 222 tapers from the second diameter to the first diameter.

This aspect of the present disclosure, a shaft having multiple diameters over a length of the shaft, is particularly advantageous where pins are produced by a metal injection molding ("MIM") process—where a mixture of powdered metal and binder are injection molded into a desired shape, and the part is then sintered to coalesce the metal into the final product. In some cases, pins produced by MIM may not have the strength of pins manufactured from similar materials using more traditional processes. As such, the present aspect of the disclosure may be used to provide strength at a central portion of the pin where higher stresses may be imposed on the pin by action of the modules.

Figure 13:
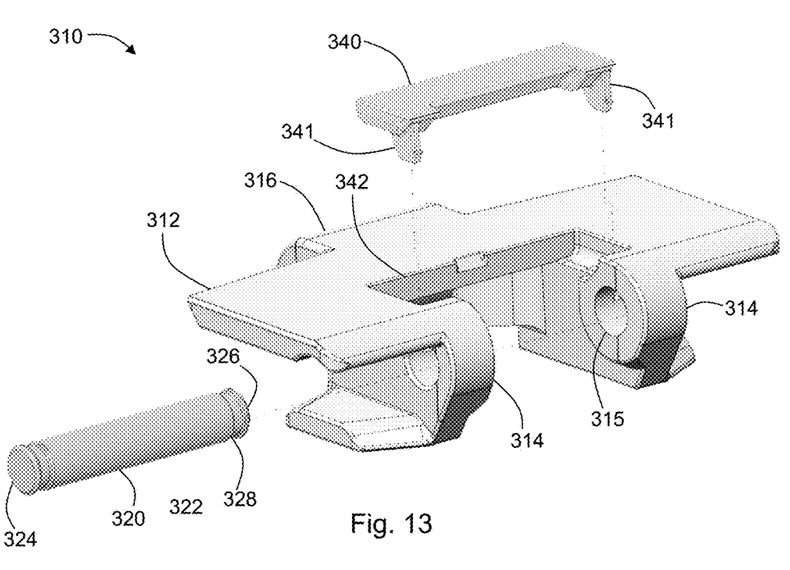
FIG. 13 is a perspective view of a module of another embodiment of the present disclosure wherein the pin and the clip are removed from the module body.
Figure 14:
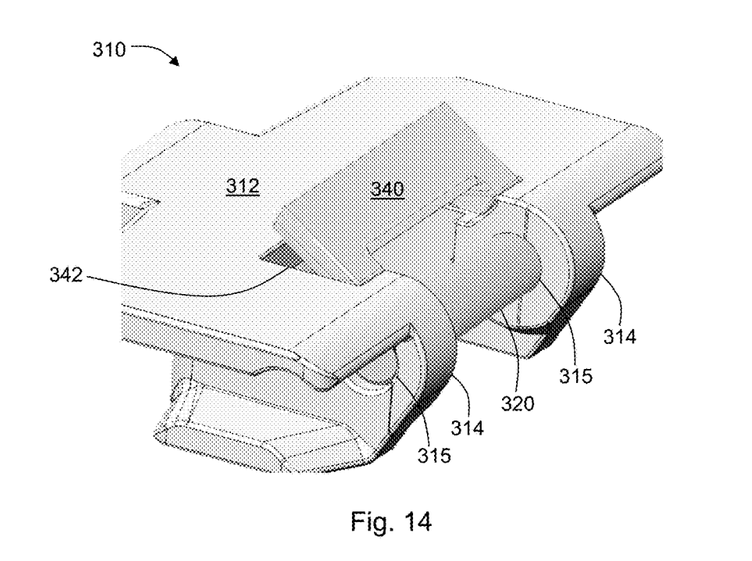
FIG. 14 depicts the module of FIG. 13 wherein the pin is inserted into the first transverse openings and the clip is depicted partially inserted into the first link ends of the module body.
Figure 15:
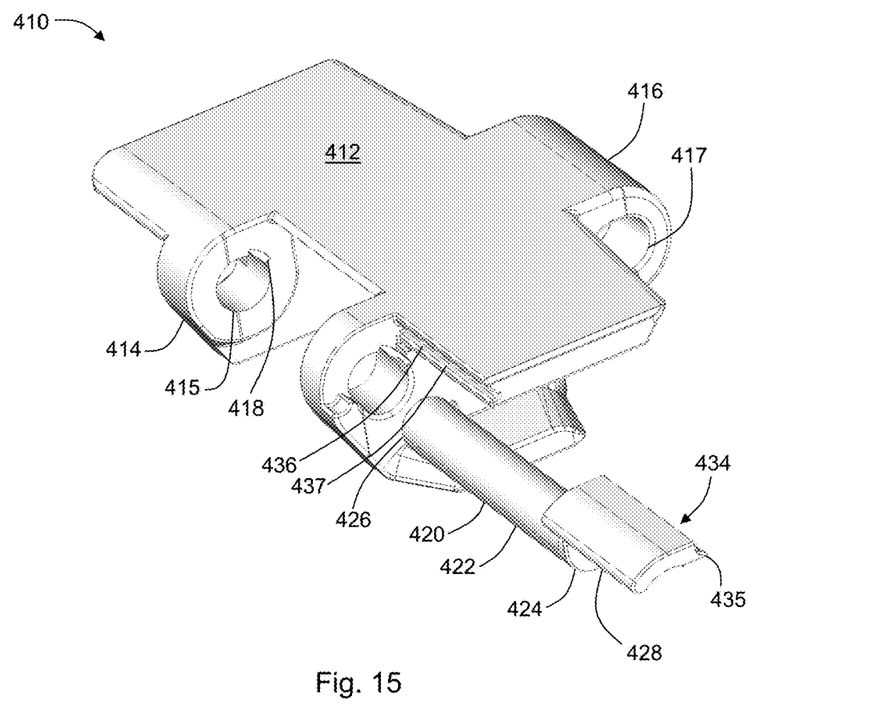
FIG. 15 is a perspective view of module according to another embodiment of the present disclosure.
Figure 16:
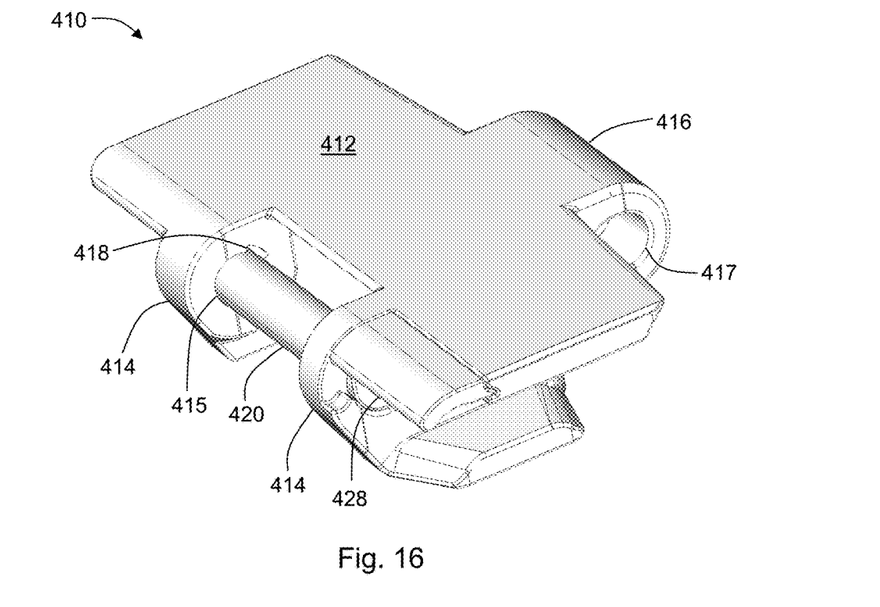
FIG. 16 is another view of the module of FIG. 15, showing the pin inserted into the module body.
Figure 17:
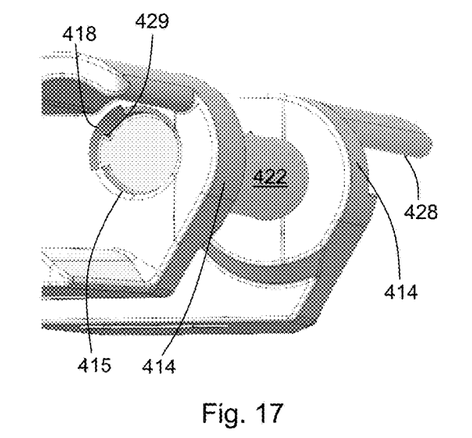
FIG. 17 is a detail view of the module of FIGS. 15-16 showing the pin inserted.
Figure 18:
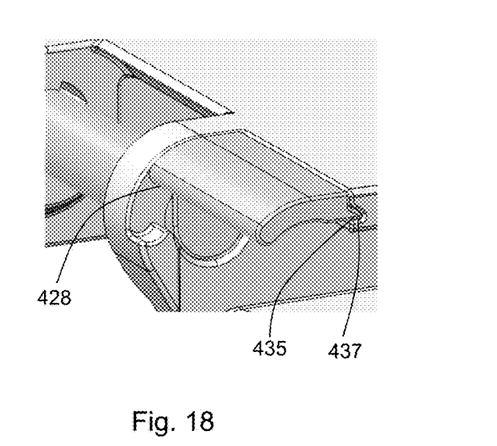
FIG. 18 is another detail view of the module of FIGS. 15-17.
Figure 19:
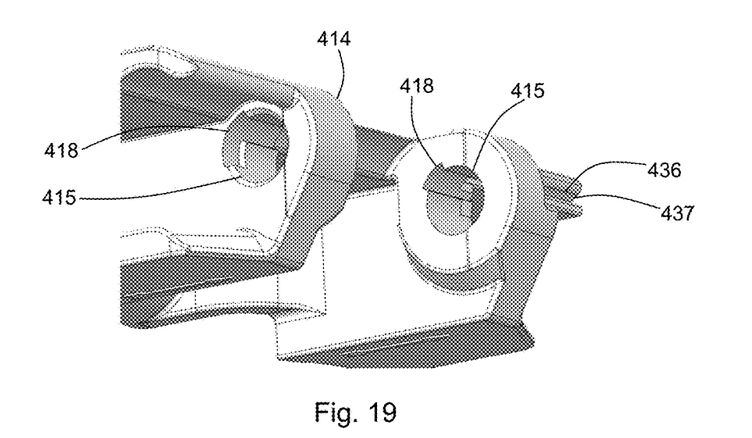
FIG. 19 is a detail view of the module body of FIGS. 15-18.
Figure 20:
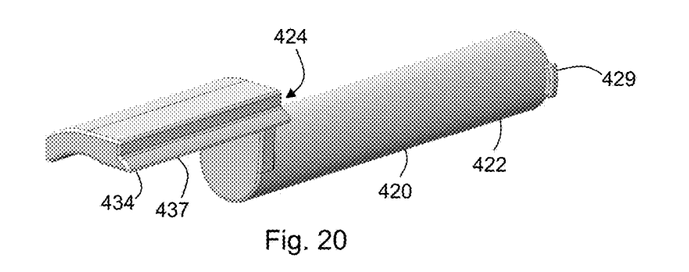
FIG. 20 is a perspective view of the pin of FIGS. 15-17.

In another aspect of the present disclosure (an example of which is depicted in FIGS. 13-14), a module 310 includes a module body 312 with a pair of first link ends 314 extending in the first direction of travel and a second link end 316 extending in the second direction of travel. Each of the first link ends 314 has a first transverse opening 315 therethrough, and the second link end 316 has a second transverse opening 317 therethrough. The first openings 315 are arranged to be aligned with the second opening 317 of an adjacent module such that the modules may be connected in a hinge-like manner.

The module 310 includes a pin 320 configured to be received in the first transverse openings 315. As such, the pin 320 is also able to be inserted through the second transverse opening 317 of an adjacent module. The pin 320 has a shaft 322 having a first end 324 and a second end 326. The shaft 322 has a groove 328 over at least a portion of a circumference. In some embodiments, such as that depicted in FIG. 3, the groove 328 extends over the entirety of a circumference of the shaft 322.

The module 310 further comprises a clip 340 configured for insertion into a corresponding cradle 342 of at least one of the first link ends 314. In some embodiments, such as that depicted in FIG. 13, the clip 340 is configured for insertion into a cradle 342 that extends into both first link ends 314 of the pair of first link ends 314. The clip 340 includes a tab 341 configured to engage the groove 328 of the pin 320. In some embodiments, the tab extends through a first link end 314 where it engages the groove 328 within the first transverse opening 315. In embodiments where the clip extends to both first link ends 314, the clip may include two tabs 341 (see, for example, FIG. 13). The tab 341 engaged with the groove 328 prevents transverse movement of the pin 320 thereby retaining the pin 320 in position in through the first link ends 314.

In another aspect of the present disclosure (an example of which is depicted in FIGS. 15-20), a module 410 includes a module body 412 with a pair of first link ends 414 extending in the first direction of travel and a second link end 416 extending in the second direction of travel. Each of the first link ends 414 has a first transverse opening 415 therethrough, and the second link end 416 has a second transverse opening 417 therethrough. The first openings 415 are arranged to be aligned with the second opening 417 of an adjacent module such that the modules may be connected in a hinge-like manner. At least one of the first transverse openings includes a bayonet keyway 418 as further described below.

The module 410 includes a pin 420 configured to be received in the first transverse openings 415. As such, the pin 420 is also able to be inserted through the second transverse opening 417 of an adjacent module. The pin 420 has a shaft 422 having a first end 424 and a second end 426. A lever 428 is affixed at the first end 424 and arranged such that a torque may be applied, for example, manually applied by an individual, to rotate the pin 420 about the shaft 422. The pin 420 further comprises a tab 429 protruding from the shaft 422. The tab 429 is configured to pass through the bayonet keyway 418 and engage an end portion of the keyway 418. For example, the keyway 418 may be L-shaped. In this way, the tab 429 may pass through the long portion of the L-shape. The pin 420 can then be rotated using the lever 428 to engage the tab 429 into the short portion of the L-shape of the keyway. Bayonet-style engagement is known in the art, and additional embodiments of suitable bayonet keyways will be apparent in light of the present disclosure. In some embodiments, the pin includes more than one key, and the first link ends comprise a corresponding configuration of keyways.

The module 410 may further include locking portions to prevent rotation of the pin 420 once the tab 429 is engaged in the keyway 418. For example, the lever 428 may include a first locking portion 434 and the corresponding module body 412 may include a second locking portion 436 configured to couple with the first locking portion 434 to prevent rotation of the pin 420. In the example depicted in FIGS. 15-20, the lever 428 includes a protrusion 435 and the lever module body 412 includes a groove 437 in which the protrusion 435 can be engaged. As such, when the tab 429 and the keyway 418 are engaged (i.e., coupled) with one another, the protrusion 437 engages with the groove 435 to inhibit rotation of the pin 420.

It should be noted that, although the modules are described as having a pair of first link ends and a corresponding second link end, embodiments of modules having more than two first link ends and a corresponding number of second link ends are contemplated and within the scope of the present disclosure. Such embodiments may include a plurality of first link ends and second link ends which interdigitate to connect adjacent modules.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A conveyor module, comprising:
a module body, comprising:
a pair of first link ends extending in a first direction of travel, each first link end having a first transverse opening therethrough and at least one of the first link ends has a first mating portion;
a second link end extending in a second direction of travel opposite the first direction, the second link end having a second transverse opening therethrough;
a pin configured to be received in the first transverse openings of the module body, the pin having a shaft and a lever affixed at a first end of the shaft, the lever having a second mating portion configured to be rotatably coupled with the first mating portion of the module body thereby preventing transverse movement of the shaft; and
wherein the at least one first link end has a first ramp with a changing elevation in a transverse direction, and wherein the lever includes a second ramp configured to be cooperate with the first ramp such that the pin is translated in a transverse direction when the pin is rotated.

2. The module of claim 1, wherein the first mating portion is a slot and the second mating portion is a tab configured for rotatable insertion into the slot.

3. The module of claim 1, wherein the first mating portion is a nest and the second mating portion is a shape of the lever configured to be contained within the nest.

4. The module of claim 1, wherein the lever comprises a first locking portion and the at least one first link end comprises a second locking portion configured to couple with the first locking portion to prevent rotation of the pin.

5. The module of claim 4, wherein the first locking portion is a protrusion and the second locking portion is a recess, wherein the protrusion is configured to couple with the recess.

6. The module of claim 4, wherein the first locking portion is a latch and the second locking portion is a ledge configured to couple with the latch.

7. The module of claim 1, wherein the shaft has a length, a first diameter at a first end portion of the length; and a second diameter at a central portion of the length.

8. The module of claim 7, wherein the shaft has a second end portion of the first diameter.

9. The module of claim 8, wherein the second diameter is greater than the first diameter.

10. The module of claim 1, wherein the pin is manufactured using a metal injection molding process.

11. A conveyor module, comprising:
a module body, comprising:
a pair of first link ends extending in a first direction of travel, each first link end having a first transverse opening therethrough and at least one of the first link ends having a first ramp with a changing elevation in a transverse direction;
a second link end extending in a second direction of travel opposite the first direction, the second link end having a second transverse opening therethrough;
a pin configured to be received in the first transverse openings of the module body, the pin having a lever affixed at a first end of a shaft, the lever having a second ramp configured to be cooperate with the first ramp such that the pin is translated in a transverse direction when the pin is rotated.

12. A conveyor module, comprising:
a module body, comprising:
a pair of first link ends extending in a first direction of travel, each first link end having a first transverse opening therethrough;
a second link end extending in a second direction of travel opposite the first direction, the second link end having a second transverse opening therethrough;
a pin configured to be received in the first transverse openings of module body, the pin having a shaft and a groove around at least a portion of a circumference of the shaft; and
a clip configured for insertion into a notch of at least one of the first link ends, the clip having a tab configured to engage the groove of the pin to prevent transverse movement of the pin.

13. The module of claim 12, wherein the notch extends to both first link ends and the clip includes two tabs, and the pin includes two grooves, and where each tab of the clip is configured to engage a corresponding groove of the pin.

14. The module of claim 12, wherein the module body comprises a first locking portion and the clip comprises a second locking portion configured to couple with the first locking portion to prevent removal of the clip from the module body.

15. The module of claim 14, wherein the first locking portion is a ledge and the second locking portion is a latch configured to couple with the ledge.

16. The module of claim 12, wherein the shaft has a length, a first diameter at a first end portion of the length, and a second diameter at a central portion of the length.

17. The module of claim 16, wherein the second diameter is greater than the first diameter.

18. The module of claim 16, wherein the shaft has a tapered portion between the first end portion and the central portion.

19. The module of claim 16, wherein the shaft has a second end portion having the first diameter.

20. The module of claim 16, wherein the shaft has a tapered portion between the central portion and the second end portion.

21. The module of claim 12, wherein the pin is manufactured using a metal injection molding process.

22. A conveyor module, comprising:
a module body, comprising:
a pair of first link ends extending in a first direction of travel, each first link end having a first transverse opening therethrough, wherein at least one of the first link ends has a bayonet keyway;
a second link end extending in a second direction of travel opposite the first direction, the second link end having a second transverse opening therethrough;
a pin configured to be received in the first transverse openings, the pin having a shaft and a lever affixed at a first end of the shaft, and wherein the pin has a bayonet tab on the shaft to cooperate with the bayonet keyway thereby retaining the pin in the first transverse openings; and
wherein at least one of the first link ends has a first ramp with a changing elevation in a transverse direction, and wherein the lever includes a second ramp configured to be cooperate with the first ramp such that the pin is translated in a transverse direction when the pin is rotated.

23. The module of claim 22, wherein the pin comprises two tabs and each of the first link ends includes corresponding bayonet keyways for engaging the tabs of the pin.

24. The module of claim 22, wherein the lever comprises a first locking portion and the module body comprises a second locking portion configured to couple with the first locking portion to prevent rotation of the pin.

25. The module of claim 24, wherein the first locking portion is a protrusion and the second locking portion is a groove, wherein the protrusion is configured to couple with the groove.

26. The module of claim 22, wherein the shaft has a length, a first diameter at a first end portion of the length, and a second diameter at a central portion of the length.

27. The module of claim 26, wherein the second diameter is greater than the first diameter.

28. The module of claim 22, wherein the pin is manufactured using a metal injection molding process.

* * * * *